United States Patent [19]

Pinto

[11] Patent Number: 5,764,662
[45] Date of Patent: Jun. 9, 1998

[54] SOLID STATE ULTRAVIOLET LASER TUNABLE FROM 223 NM TO 243 NM

[75] Inventor: Joseph F. Pinto, Laurel, Md.

[73] Assignee: The United States of America as represented by the Secretary of the Navy, Washington, D.C.

[21] Appl. No.: 789,011

[22] Filed: Jan. 27, 1997

[51] Int. Cl.[6] .................................................. H01S 3/10
[52] U.S. Cl. ........................... 372/20; 372/41; 372/22; 372/93; 372/5
[58] Field of Search ............................ 372/92, 41, 22, 372/10, 20, 93, 5

*Primary Examiner*—Leon Scott, Jr.
*Attorney, Agent, or Firm*—Thomas McDonnell; George Jameson

[57] ABSTRACT

An ultraviolet laser system is disclosed for generating an ultraviolet frequency in the spectral region between 223 nm and 243 nm by mixing the tunable output of a $Ce^{3+}$:LiCAF laser with the 1064 nm radiation from a Nd:YAG pump laser in a BBO nonlinear crystal.

20 Claims, 2 Drawing Sheets

SOLID STATE ULTRAVIOLET LASER TUNABLE FROM 223 NM TO 243 NM

BACKGROUND OF THE INVENTION

1. Field of the Invention

This invention relates to tunable solid state ultraviolet lasers and more particularly to tunable cerium-doped solid state laser that can operate between 223–243 nm for atmospheric sensing applications.

2. Background of the Invention

There are currently no simple solid state laser systems that can continuously tune and operate in the ultraviolet wavelength range between 223 nm and 243 nm.

SUMMARY OF THE INVENTION

It is therefore an object of the invention to provide a cerium-doped laser that is continuously tunable over the wavelength range between 223 nm and 243 nm.

Another object of the invention is to provide a tunable solid state laser over the ultraviolet wavelength range between 223 nm and 243 nm.

A further object of the invention is provide an ultraviolet laser system for generating an ultraviolet frequency in the spectral region between 223 nm and 243 nm by mixing the tunable output of a $Ce^{3+}$:LiCAF laser with the 1064 nm radiation from a Nd:YAG pump laser in a BBO nonlinear crystal.

These and other objects of the invention are achieved by providing an ultraviolet laser system for generating an ultraviolet frequency in the spectral region between 223 nm and 243 nm by mixing the tunable output of a $Ce^{3+}$:LiCAF laser with the 1064 nm radiation from a Nd:YAG pump laser in a BBO nonlinear crystal.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIG. 2 is a curve which illustrates a part of the sum frequency output energy from the BBO nonlinear crystal as a

DETAILED DESCRIPTION OF THE PREFERRED EMBODIMENT

Figure 1:
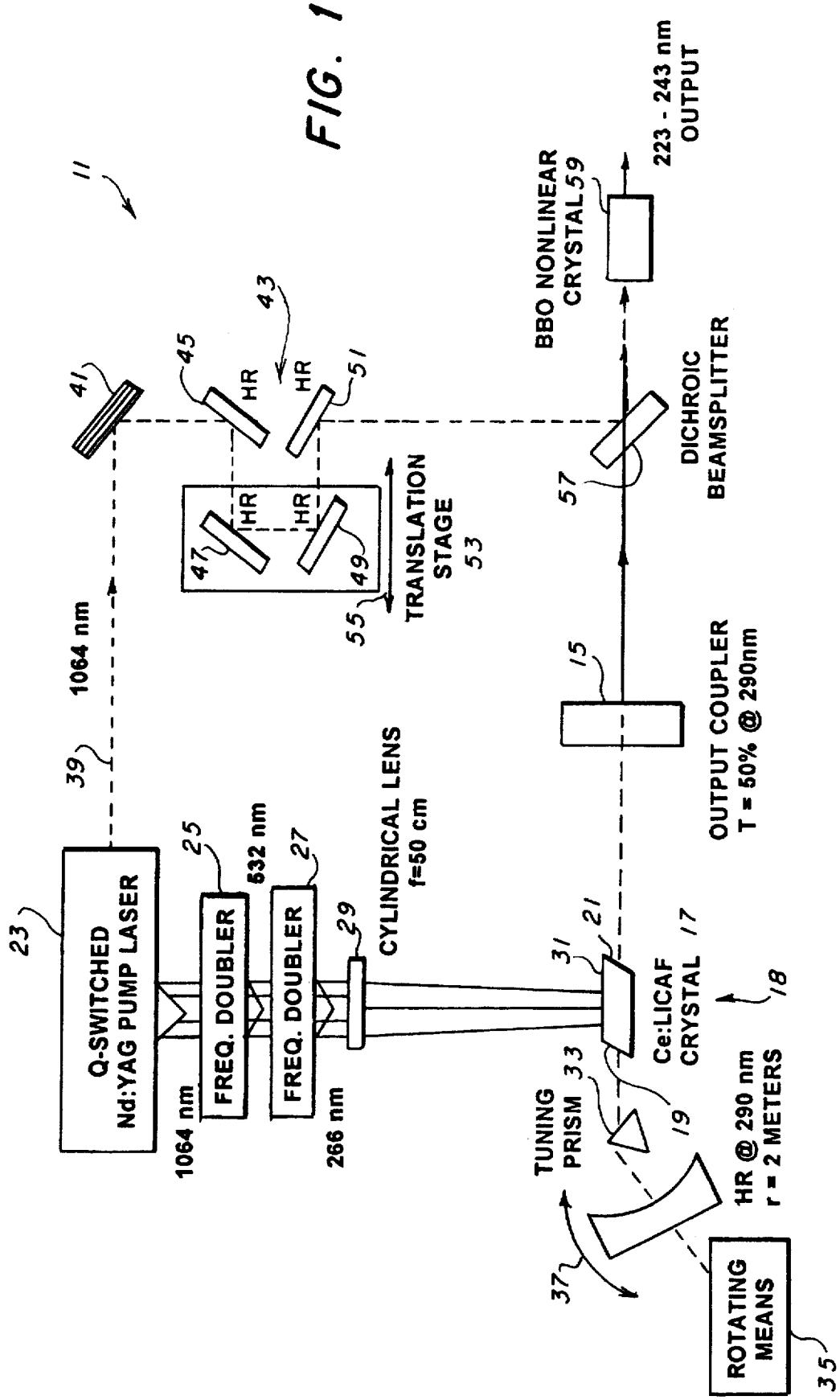
FIG. 1 is a schematic diagram of an exemplary preferred embodiment of a solid state ultraviolet laser of the invention that is tunable between 223 nm and 243 nm.

Referring now to the drawings, FIG. 1 illustrates a schematic diagram of an exemplary preferred embodiment of a solid state ultraviolet laser 11 of the invention that is tunable over the ultraviolet wavelength range between about 223 nm and about 243 nm.

The tunable solid state ultraviolet laser 11 of the invention is shown in FIG. 1. In an exemplary embodiment, The ultraviolet laser 11 is tunable between 223 nm and 243 nm by mixing the tunable output of a $Ce^{3+}$:LiCAF crystal laser with the 1064 nm radiation from a Nd:YAG pump laser in a BBO nonlinear crystal.

Gain-switched $Ce^{3+}$:LiCAF crystal laser operation is obtained by utilizing a transversely-pumped, near planar stable resonator geometry. The laser resonator or cavity is established by an exemplary 2 meter radius of curvature, high reflector mirror 13 at a wavelength of 290 nm and an exemplary flat output coupler mirror 15 of 50% transmission at 290 nm separated by about 7 centimeters (cm).

A $Ce^{3+}$:LiCAF crystal 17, which has exemplary dimensions of 8 millimeters (8 mm)×8 mm×30 mm, is disposed midway between the two cavity end mirrors 13 and 15 to form a $Ce^{3+}$:LiCAF crystal laser 18. The $Ce^{3+}$:LiCAF crystal 17 is oriented with its optical axis (c-axis) perpendicular to the resonator or cavity axis. End faces 19 and 21 of the crystal 17 are cut and polished at Brewster's angle. The end faces 19 and 21 are each cut at an angle corresponding to Brewster's angle to minimize p-polarized light.

It should be noted at this time that a $Ce^{3+}$:LiSAF crystal could be substituted for the $Ce^{3+}$:LiCAF crystal 17.

The concentration of $Ce^{3+}$ions or dopants in the crystal 17 preferably will be selected to reflect the trade off between optimal crystal quality and optimal laser power density. Higher concentrations of $Ce^{3+}$dopant will generally lead to larger power densities, and desirably higher power outputs. However, $Ce^{3+}$is a large ion which does not fit especially well in a LiCAF host at high concentrations. If the dopant concentration is too high, excessive crystalline defects will result. As the cerium material growth techniques are developed and improved, the quality of the cerium-doped colquiriites will also improve. This will allow higher concentrations of trivalent cerium to be incorporated into the host material without sacrificing material quality and laser output beam quality. Thus, scaling to higher output laser powers will be easier with the higher cerium concentration host materials, once the optimum material growth parameters are identified. Typically, the $Ce^{3+}$dopant concentration will be between about 0.01% and about 1.0%. Preferably, the $Ce^{3+}$ dopant concentration will be between about 0.03% and about 0.3 W. More preferably, the $Ce^{3+}$dopant concentration will be between about 0.08% and about 0.1%.

A Q-switched neodymium YAG (Nd:YAG) laser 23, switched at a 10 Hz rate, generates a pulsed primary or fundamental wavelength at 1064 nm (1.064 microns). A portion of this primary radiation at 1064 nm is frequency doubled by a frequency doubler crystal 25 diaposed in the optical path between the Nd:YAG pump laser 23 and the $Ce^{3+}$:LiCAF crystal 17 to produce radiation having a wavelength of 532 nm. The crystal 25 can be a KDP crystal.

The radiation at 532 nm from the frequency doubler crystal 25 is, in turn, frequency doubled in a frequency doubler crystal 27 disposed in the optical path between the frequency doubler crystal 25 and the $Ce^{3+}$:LiCAF crystal 17 to produce an optical pump beam radiation having a wavelength of 266 nm. The crystal 27 can be an ADP crystal. Other 4th harmonic Nd host materials can be used, such as Nd:YLF, Nd:YALO and Nd:YVO$_4$. Other non-linear materials to generate the 2nd and 4th harmonics can be used, such as BBO and LBO.

The pump laser 23 and the frequency doublers 25 and 27 collectively operate to produce an output which operates in the absorption band of the $Ce^{3+}$:LiCAF crystal 17. More preferably, the pump laser 23 and the frequency doublers 25 and 27 collectively operate to produce a wavelength output between about 260 nm and about 275 nm. For purposes of this discussion,that wavelength will be assumed to be 266 nm.

Thus, as discussed above, optical pumping is initiated by a frequency-quadrupled 10 Hz, Q-switched Nd:YAG laser operating at 266 nm. The pump beam polarization is aligned parallel to the c-axis of the crystal 17 to minimize losses associated with a-axis excited absorption of the 266 nm pump radiation from the frequency doubler 27.

The 266 nm pump beam from the frequency doubler crystal 27 is focused by a 50 cm focal length cylindrical lens 29 into a 1 mm×19 mm line image along a focal line into one side 31 of the Ce$^{3+}$:LiCAF crystal 17. Side-pumping provides the ability to distribute pumping energy along the length of the crystal 17, thus minimizing fluence. Since higher fluences are associated with greater potential for optical damage to the surface of the crystal 17, it is preferred to distribute the input of the pump energy as much as possible.

An intracavity Brewster-angle Suprasil prism 33 is disposed at Brewster's angle in the laser cavity between the Ce$^{3+}$:LiCAF crystal 17 and the high reflector mirror 13 for tuning purposes. The prism 33 is made of a Suprasil material that is transparent to ultraviolet light.

The Ce$^{3+}$:LiCAF crystal laser 17 can be continuously tuned from 281 nm to 315 nm by adjusting the horizontal tilt to the high reflector end mirror 13 to change the normal direction of this mirror 13. Various frequency components will be coming out of the prism 33 at slightly different angles by simply adjusting the tilt of this mirror 13. After the horizontal tilt of the mirror 13 has been adjusted to a desired angle, the fluorescence of the crystal 17 will pass through the tuning prism 33. The tuning prism 33 will disperse the frequency components in the fluorescence. Only one of these frequency components will be normal to the high reflector end mirror 13. That frequency component will be the one that will find the highest gain and the lowest loss. That one will be the frequency component that the Ce$^{3+}$:LiCAF crystal 17 will start to lase at within the cavity defined by the mirrors 13 and 15. The other frequency components will see no gain whatsoever because there is no feedback established for those other frequency components, and they will pass through the mirror 13.

Continuous tuning of the crystal laser 17 can be achieved by using a rotating means 35, such as a motor or a thumbscrew, which is operationally coupled to the high reflector end mirror 13, to slowly rotate the end mirror 13 about its axis in either of the directions indicated by the arc 37.

The output of the Ce$^{3+}$:LiCAF crystal laser 18 is taken from the 50% transmission output coupler 15. However, it should be noted at this time that the transmission of the output coupler 15 is not limited to a 50% output coupler. Depending on the desired operation, the output coupler 15 could have a transmission of 30%, 70% or any other suitable transmission. For purposes of this discussion, the output coupler will have a transmission of 50%.

The Ce$^{3+}$:LiCAF crystal laser 18 output will normally be peaked at about 290 nm. However, it should be recalled that the Ce$^{3+}$:LiCAF crystal laser 18 can be continuously tuned from about 281 nm all the way out to about 315 nm.

Utilizing the 50% transmission output coupler 15, the Ce$^{3+}$:LiCAF crystal laser 18 can deliver an output energy of about 13.7 mJ for an incident pump beam energy of about 40.5 mJ, with a corresponding slope efficiency of about 38%. The temporal duration of the gain-switched laser output is 4 nsec FWHM. With the intracavity Suprasil prism 33, the lasing linewidth is approximately 4 ÅFWHM. Using the broadband 50% transmission output coupler 15, continuous tunability of the Ce$^{3+}$:LiCAF crystal laser 18 can be obtained from 281 nm to 315 nm, as seated above.

At the same time that the 290 nm output is being generated by the Ce$^{3+}$:LiCAF crystal laser 18, a portion of the 1064 nm radiation from the Nd:YAG laser 23 is directed along a path 39 and reflects from a highly reflective mirror 41 to a variable optical time delay circuit 43. The variable optical time delay circuit 43 is comprised of highly reflective mirrors 45, 47, 49 and 51 at 1064 nm., with the mirrors 47 and 49 mounted in a fixed relationship to a translation stage 53 that is translatable in the directions of the double arrows 55. Thus, the mirrors 47 and 49 can can be translated in either of the two directions shown by the arrows 55. Typically, the translation stage 53 is mounted to translation means (not shown), that is movable by a mechanism (not shown), such as a screw or an electric motor. The translation means causes the translation stage to move the assembly of mirrors 47 and 49 closer to (or further away from) the mirrors 45 and 51 to shorten (or lengthen) the length of the variable optical delay line 43.

The 1064 nm radiation from the mirror 41 sequentially reflects off the mirrors 45, 47, 49 and 51 and is incident upon a dichroic beamsplitter 57. Thus, at this time there will be two beams incident on the dichroic beamsplitter 57. One beam is the tunable output from the Ce$^{3+}$:LiCAF crystal laser 18, while the other beam is the time-delayed portion of the 1064 nm radiation from the Nd:YAG laser 23.

The dichroic beamsplitter 57 transmits therethrough almost 100% of the ultraviolet light from the Ce$^{3+}$:LiCAF crystal laser 18 and simultaneously reflects almost 100% of the incident 1064 nm output. At the output of the dichroic beamsplitter 57, the 1064 nm radiation is colinear with ultraviolet radiation from the Ce$^{3+}$:LiCAF crystal laser 18. These two radiation beams are overlapped at this point, both spatially and temporally. This is important. They are spatially overlapped because they were physically combined into one composite beam. They are temporally overlapped because the delay path length of the 1064 nm radiation through the variable optical time delay circuit 43 can be changed by moving the assembly of mirrors 47 and 49 away from or toward the mirrors 45 and 51 to ensure temporal overlap of the pulses of the 1064 nm radiation with the pulses of the ultraviolet Ce$^{3+}$:LiCAF crystal laser 18 radiation.

The spatially and temporally overlapped beams in the combined beam at the output of the dichroic beamsplitter 57 are applied to an uncoated BBO nonlinear crystal 59 which frequency mixes the overlapped ultraviolet Ce$^{3+}$:LiCAF laser 18 output with the residual 1064 nm Nd:YAG radiation to produce an ultraviolet output that is tunable between 223 nm and 243 nm. The BBO nonlinear crystal 59 has dimensions of 4 mm×4 mm×7 mm, and is cut at θ=46° for Type I phasematching.

Figure 2:
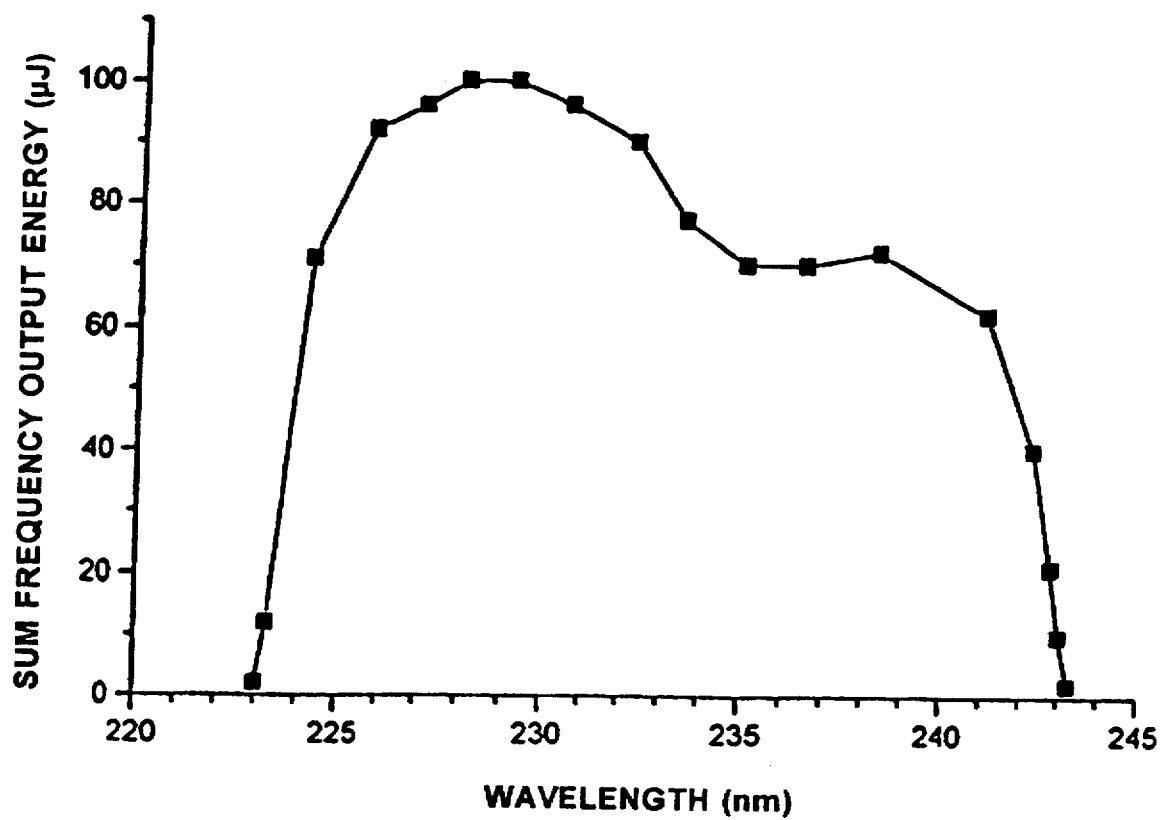

FIG. 2 shows an energy tuning curve corresponding to sum frequency mixing of the Ce$^{3+}$:LiCAF laser 18 output with the residual 1064 nm Nd:YAG pump laser radiation. This tuning data is obtained by mixing the output of the Ce$^{3+}$:LiCAF tunable laser 18 with 9.5 mJ of 1064 nm Nd:YAG laser output energy.

ADVANTAGES AND NEW FEATURES

Other potential systems and methods for generating some of these wavelengths are to use the 5th harmonic of Nd and then use rotational or vibrational Raman to shift to longer wavelengths. This would be a much more complex and less efficient system or process. In addition, continuous tuning over the wavelength range such as accomplished in the present application, is highly unlikely.

Therefore, what has been described in a preferred embodiment of the invention is an ultraviolet laser system for generating an ultraviolet frequency in the spectral region between 223 nm and 243 nm by mixing the tunable output of a Ce$^{3+}$:LiCAF laser with the 1064 nm radiation from a Nd:YAG pump laser in a BBO nonlinear crystal.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured: By Letters Patent of the United States is:

1. An ultraviolet solid state laser comprising:
    a laser cavity defined by a first mirror and an opposing output coupler mirror;
    a laser crystal disposed in said laser cavity, said laser crystal having a host material doped with an amount of cerium ions sufficient to produce a longitudinal mode laser emission when said laser crystal is pumped by a pump beam and in which the cerium has an absorption band within the cerium-doped laser crystal;
    means for producing pulsed radiation at an output first wavelength and a pulsed pump beam having an output second wavelength that is within the absorption band of the cerium within said cerium-doped laser crystal;
    a cylindrical lens for focusing said pulsed pump beam into a line image along a focal line in said cerium-doped laser crystal to cause said cerium-doped laser crystal to produce a pulsed output;
    means for directing the pulsed radiation at the output first wavelength along a first path;
    means disposed in the first path for reflecting said pump beam along a second path and for passing the pulsed output of said cerium-doped laser crystal along the second path; and
    a non-linear mixer crystal disposed along the second path for sum wavelength mixing of said pulsed pump beam and said pulsed output of said cerium-doped laser crystal to produce an ultraviolet wavelength between about 223 nm and about 243 nm.

2. The ultraviolet solid state laser of claim 1 wherein:
    said laser crystal is doped with a concentration of cerium from about 0.01% to about 1.0%.

3. The ultraviolet solid state laser of claim 1 wherein:
    said laser crystal is doped with a preferred concentration of cerium from about 0.03% to about 0.3%.

4. The ultraviolet solid state laser of claim 1 wherein:
    said laser crystal is doped with a most preferred concentration of cerium from about 0.08% to about 0.1%.

5. The ultraviolet solid state laser of claim 1 wherein:
    said laser crystal is doped with the maximum cerium concentration without deleterious effects on material quality.

6. The ultraviolet solid state laser of claim 1 wherein:
    said host material is selected from the group consisting of LiCAF and LiSAF.

7. The ultraviolet solid state laser of claim 1 wherein said producing means comprises:
    a Q-switched neodymium solid state laser for producing pulsed radiation at the output first wavelength; and
    means responsive to the pulsed radiation at the output first wavelength for operating in the fourth harmonic of neodymium to produce pulsed radiation at the output second wavelength.

8. The ultraviolet solid state laser of claim 7 wherein said Q-switched neodymium solid state laser includes:
    $Nd^{3+}$ ions doped into a host material selected from the group consisting of YAG, YALO, YLF, $YVO_4$ and mixtures thereof for producing said pulsed radiation at an output first wavelength.

9. The ultraviolet solid state laser of claim 8 wherein said operating means includes:
    means responsive to the pulsed radiation at said output first wavelength from said neodymium solid state laser for quadrupling the frequency of the output first wavelength to produce pulsed radiation at the output second wavelength.

10. The ultraviolet solid state laser of claim 1 wherein said producing means comprises:
    a frequency quadrupled neodymium YAG laser.

11. The ultraviolet solid state laser of claim 10 wherein said frequency quadrupled neodymium YAG laser comprises:
    a neodymium YAG laser for producing the pulsed radiation at an output first wavelength of about 1064 nm;
    a first frequency doubler responsive to the 1064 nm output from said neodymium YAG laser for generating 532 nm radiation; and
    a second frequency doubler responsive to the 532 nm radiation from said first frequency doubler for generating a 266 nm pump beam.

12. The ultraviolet solid state laser of claim 11 wherein:
    said first frequency doubler is selected from the group consisting of KDP, KD*P, LBO and BBO nonlinear crystals; and
    said second frequency doubler is selected from the group consisting of ADP, LBO and BBO nonlinear crystals.

13. The ultraviolet solid state laser of claim 12 wherein:
    said first frequency doubler is an KDP crystal; and
    said second frequency doubler is a ADP crystal.

14. The ultraviolet solid state laser of claim 1 further including:
    means operationally coupled to said cerium-doped laser crystal for tuning said cerium-doped laser crystal from 281 nm to 315 nm to enable said non-linear mixer crystal to produce an ultraviolet wavelength between about 223 nm and about 243 nm.

15. The ultraviolet solid state laser of claim 1 further including:
    a tuning prism disposed in said laser cavity between said laser crystal and said first mirror for dispersing said pulsed output from said laser crystal into a plurality of frequency components at different angles; and
    means operationally coupled to said first mirror for rotating said first mirror to adjust the tilt of said first mirror such that a selected one of said plurality of frequency components is normal to said first mirror and is at an associated wavelength between 281 nm to 315 nm to enable said non-linear mixer crystal to produce an ultraviolet wavelength between about 223 nm and about 243 nm.

16. The ultraviolet solid state laser of claim 15 wherein:
    said tuning prism is transparent to ultraviolet light.

17. The ultraviolet solid state laser of claim 16 wherein:
    said tuning prism is a suprasil tuning prism.

18. The ultraviolet solid state laser of claim 1 further including:
    said rotating means selected from the group consisting of a motor and a thumbscrew.

19. The ultraviolet solid state laser of claim 1 further including:
    means disposed in said first path for optically delaying the output first wavelength so that the pulses of said delayed output first wavelength temporally and spatially overlap the pulsed output of said cerium-doped laser crystal along the second path.

20. The ultraviolet solid state laser of claim 1 wherein:
    said non-linear mixer crystal is a BBO nonlinear crystal.

* * * * *

UNITED STATES PATENT AND TRADEMARK OFFICE
CERTIFICATE OF CORRECTION

PATENT NO. : 5,764,662
DATED : June 9, 1998
INVENTOR(S) : Joseph F. Pinto It is certified that error appears in the above-identified patent and that said Letters Patent is hereby corrected as shown below:

On the title page, item (75) should read as follows:

--Inventors: Joseph F. Pinto, Laurel, MD;
Leon Esterowitz, Springfield, VA. --

Signed and Sealed this

Fifteenth Day of February, 2000

Attest:

Q. TODD DICKINSON

Attesting Officer

Commissioner of Patents and Trademarks